Patented Aug. 21, 1945

2,383,137

UNITED STATES PATENT OFFICE 2,383,137

ACETYLATION OF CYANOHYDRINS

Hans Z. Lecher, Plainfield, and James Kenneth Dixon, Bound Brook, N. J., assignors to American Cyanamid Company, New York, N. Y., a corporation of Maine No Drawing. Application December 5, 1939, Serial No. 307,584

16 Claims. (Cl. 260—464)

This invention relates to a process of producing acetic acid esters of $\alpha,\alpha'$ or $\alpha,\beta$ cyanohydrins.

Acetic acid esters of these cyanohydrins are of considerable importance as they form excellent raw materials for the production of $\alpha,\beta$ unsaturated nitriles having the same number of carbon atoms as the cyanohydrin. However, in the past acetylation of cyanohydrins has required the use of acetic anhydride and the process is not as cheap and efficient as could be desired.

The present invention is based on the use of ketene as an acetylating agent for $\alpha,\alpha'$ and $\alpha,\beta$ cyanohydrins. Ketene has been used for certain acetylating reactions such as for example the production of esters from alcohols. However, cyanohydrins have never been reacted with ketene, and, as a matter of fact, it could not be predicted that $\alpha,\alpha'$ and $\alpha,\beta$ cyanohydrins could be satisfactorily acetylated with ketene since the vicinity of negative groups is known to modify the reactivity of the hydroxyl group and since also the stability of these cyanohydrins is quite different from the stability of ordinary alcohols. In the preparation of acetic acid esters from alcohols and ketene, acids are used as catalysts, but it could not be predicted whether the acid catalyst would also be necessary to promote the reaction of cyanohydrins with ketene or whether the acid would either saponify the nitrile group or decompose the $\alpha,\alpha'$ cyanohydrins into the carbonyl compound and hydrocyanic acid.

The relatively low price for which ketene can now be obtained makes the process not only efficient from the theoretical standpoint, but also economical.

The present invention is applicable generally to $\alpha,\alpha'$ and $\alpha,\beta$ cyanohydrins of both the aliphatic, alicyclic, heterocyclic and aralkyl series. In a narrower aspect the invention is of particular value in acetylating cyanohydrins in which the hydroxyl group is attached to one carbon atom of the $\alpha,\beta$ linkage and at least one hydrogen atom is attached to the other carbon atom. These preferred acetic esters can be transformed into unsaturated nitriles by splitting out acetic acid.

Typical cyanohydrins for which the present invention is useful are the following: acetaldehyde cyanohydrin, acetone cyanohydrin, crotonaldehyde cyanohydrin, cyclohexanol cyanohydrin, phenyl acetaldehyde cyanohydrin 2-thienyl acetaldehyde cyanohydrin, ethylene cyanohydrin, propylene cyanohydrin, styrene cyanohydrin and trimethyl acetaldehyde cyanohydrin.

It is an advantage of the present invention that the ketene used does not have to be pure. On the contrary, it is possible to use crude ketene such as for example the crude mixture obtained by the pyrolysis of acetone which contains methane, ethylene, carbon monoxide, and the like. These impurities have been found to be unobjectionable in the process of the present invention and a material economic saving is effected because the purification of crude ketene is somewhat costly and the process is not affected by varying purity of the ketene.

The reaction of ketene with cyanohydrins is exothermic and when ketene is passed through the cyanohydrins at room temperature, the temperature may rise somewhat. The process can be carried out if desired at room temperature without additional heating. This is a further advantage of the present invention but it should be understood that higher tempeatures may be employed. The reaction is not very sensitive to temperature changes and in general the upper limit of the temperature used is set by the stability of the particular cyanohydrin which is being acetylated and by the stability of the ketene.

Ketene is soluble in many of the cyanohydrins and equipment must be constructed to permit complete absorption of ketene as otherwise losses result. Increased absorption can be obtained by the use of a counter current absorption system or suitable diluents or both. The use of a diluent such as acetone has the further advantage that it minimizes the formation of tar.

The present invention will be described in greater detail in conjunction with the following examples which illustrate typical cyanohydrins:

*Example 1*

Acetaldehyde cyanohydrin was charged to each of three absorption vessels in series, and ketene was passed through. The liquid warmed up considerably due to the heat of reaction. Therefore the last absorption vessel was cooled to about 0° to avoid evaporation losses of cyanohydrin. When the first reaction vessel did not show any more heat formation the reaction was interrupted and the contents of the reaction vessels were fractionally distilled under reduced pressure. Part of the cyanohydrin was recovered unchanged, the remainder had been converted into the desired acetic acid ester in almost theoretical yield.

*Example 2*

Ketene made by pyrolysis of acetone was passed through a solution of 122 parts by weight of acetone cyanohydrin in 100 parts by weight of benzene for four hours at 25–40° C. The product of reaction was heated under reduced pressure to remove benzene and was then heated under atmospheric pressure, under which conditions unconverted acetone cyanohydrin decomposed. Further distillation removed traces of acetic anhydride and finally the desired alpha acetoxy isobutyric acid nitrile was collected in good yield.

*Example 3*

Ketene made by pyrolysis of acetone was passed through 85 parts of ethylene cyanohydrin for 3 hours at 40–50° C., after which time reaction ceased. The product was fractionated under reduced pressure to give beta-acetoxy propionitrile in excellent yield.

*Example 4*

The reaction was carried out as in Example 3 starting with 60 parts of propylene cyanohydrin. Beta-acetoxy butyronitrile was obtained in very good yield.

What we claim is:

1. A method of producing acetic acid esters of cyanohydrins included in the group consisting of $\alpha,\alpha'$ and $\alpha,\beta$ cyanohydrins which comprises subprises subjecting the cyanohydrin to reaction with ketene.

2. A method of producing acetic acid esters of cyanohydrins included in the group consisting of $\alpha,\alpha'$ and $\alpha,\beta$ cyanohydrins which comprises subjecting the cyanohydrin to reaction with ketene in the presence of an inert diluent.

3. A method of producing acetic acid esters of cyanohydrins included in the group consisting of $\alpha,\alpha'$ and $\alpha,\beta$ cyanohydrins in which the hydroxyl group is attached to one carbon atom of the $\alpha,\beta$-linkage and at least one hydrogen atom is attached to the other carbon atom, which comprises subjecting the cyanohydrin to reaction with ketene.

4. A method of producing acetic acid esters of cyanohydrins included in the group consisting of $\alpha,\alpha'$ and $\alpha,\beta$ cyanohydrins in which the hydroxyl group is attached to one carbon atom of the $\alpha,\beta$-linkage and at least one hydrogen atom is attached to the other carbon atom, which comprises subjecting the cyanohydrin to reaction with ketene in the presence of an inert diluent.

5. A method of producing acetic acid esters of cyanohydrins included in the group consisting of $\alpha,\alpha'$ and $\alpha,\beta$ cyanohydrins which comprises bringing into contact the cyanohydrin and ketene at substantially room temperature without additional heating.

6. A method of producing acetic acid esters of cyanohydrins included in the group consisting of $\alpha,\alpha'$ and $\alpha,\beta$ cyanohydrins in which the hydroxyl group is attached to one carbon atom of the $\alpha,\beta$-linkage and at least one hydrogen atom is attached to the other carbon atom, which comprises bringing into contact the cyanohydrin and ketene at substantially room temperature without additional heating.

7. A method according to claim 1 in which ketene is crude ketene obtained by the pyrolysis of acetone.

8. A method according to claim 2 in which ketene is crude ketene obtained by the pyrolysis of acetone.

9. A method according to claim 3 in which ketene is crude ketene obtained by the pyrolysis of acetone.

10. A method according to claim 4 in which ketene is crude ketene obtained by the pyrolysis of acetone.

11. A method of preparing the acetic acid ester of acetaldehyde cyanohydrin which comprises bringing about the reaction between acetaldehyde cyanohydrin and ketene.

12. A method of preparing the acetic acid ester of acetone cyanohydrin which comprises bringing about the reaction between acetone cyanohydrin and ketene.

13. A method of preparing the acetic acid ester of ethylene cyanohydrin which comprises bringing about the reaction between ethylene cyanohydrin and ketene.

14. A method according to claim 11 in which the reaction is brought about in the presence of an inert diluent.

15. A method according to claim 12 in which the reaction is brought about in the presence of an inert diluent.

16. A method according to claim 13 in which the reaction is brought about in the presence of an inert diluent.

HANS Z. LECHER.
JAMES KENNETH DIXON.